US009719586B2

(12) United States Patent
Schulte et al.

(10) Patent No.: US 9,719,586 B2
(45) Date of Patent: Aug. 1, 2017

(54) RAMPING SUBSYSTEM FOR A MACHINE WITH A DUAL PATH ELECTRONICALLY CONTROLLED HYDROSTATIC TRANSMISSION

(71) Applicant: CNH AMERICA LLC, New Holland, PA (US)

(72) Inventors: David Schulte, Clarendon Hills, IA (US); Kushan Vora, Willowbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 434 days.

(21) Appl. No.: 14/066,196

(22) Filed: Oct. 29, 2013

(65) Prior Publication Data

US 2014/0174067 A1 Jun. 26, 2014

Related U.S. Application Data

(60) Provisional application No. 61/740,811, filed on Dec. 21, 2012, provisional application No. 61/740,750, filed on Dec. 21, 2012, provisional application No. 61/740,772, filed on Dec. 21, 2012, provisional application No. 61/740,788, filed on Dec. 21, 2012.

(51) Int. Cl.
| | |
|---|---|
| *F16H 39/14* | (2006.01) |
| *B60W 10/00* | (2006.01) |
| *E02F 9/22* | (2006.01) |
| *F16H 61/431* | (2010.01) |
| *F16H 61/46* | (2010.01) |
| *E02F 3/84* | (2006.01) |
| *F16H 61/47* | (2010.01) |

(52) U.S. Cl.
CPC ........... *F16H 39/14* (2013.01); *B60K 41/004* (2013.01); *E02F 3/841* (2013.01); *E02F 9/2246* (2013.01); *E02F 9/2292* (2013.01); *F16H 61/431* (2013.01); *F16H 61/46* (2013.01); *F16H 61/47* (2013.01)

(58) Field of Classification Search
CPC . F16H 59/00; F16H 39/14; G06F 7/00; G06F 19/00
See application file for complete search history.

(56) References Cited

U.S. PATENT DOCUMENTS

| | | |
|---|---|---|
| 3,247,919 A | 4/1966 | Moon, Jr. |
| 3,795,107 A | 3/1974 | Ward |
| 3,914,938 A | 10/1975 | Cornell et al. |
| 4,019,596 A | 4/1977 | Crull |
| 4,023,637 A | 5/1977 | Jackovich |
| 4,086,767 A | 5/1978 | Byers, Jr. |

(Continued)

*Primary Examiner* — Yonel Beaulieu
*Assistant Examiner* — Martin Weeks
(74) *Attorney, Agent, or Firm* — Patrick M. Sheldrake (57) ABSTRACT

A ramping subsystem of a control system for a dual path electronically controlled hydrostatic transmission is used to modify the commanded rate of change of pump and motor acceleration, deceleration and direction change command (performed to command machine motion from forward to reverse or vice versa) in order to achieve desired machine performance and operator feel. Pump and motor acceleration, deceleration and direction change command rates are then further modified using scaling tables based on selected maximum machine speed using operator input device.

20 Claims, 8 Drawing Sheets

(56) References Cited

U.S. PATENT DOCUMENTS

| | | | |
|---|---|---|---|
| 4,103,489 A | 8/1978 | Fletcher et al. | |
| 4,399,886 A | 8/1983 | Pollman | |
| 4,461,147 A | 7/1984 | Myers | |
| 4,523,892 A | 6/1985 | Mitchell et al. | |
| 4,531,601 A | 7/1985 | Barbagli | |
| 4,534,707 A | 8/1985 | Mitchell | |
| 4,739,616 A | 4/1988 | Myers | |
| 4,932,208 A | 6/1990 | Koyama et al. | |
| 4,969,439 A * | 11/1990 | Scotson | 123/406.23 |
| 5,001,900 A | 3/1991 | Sasajima et al. | |
| 5,048,293 A | 9/1991 | Aoyagi | |
| 5,177,964 A | 1/1993 | Tanaka et al. | |
| 5,178,229 A | 1/1993 | Strenzke | |
| 5,246,081 A | 9/1993 | Engle | |
| 5,297,381 A | 3/1994 | Eich et al. | |
| 5,394,696 A | 3/1995 | Eich et al. | |
| 5,419,128 A | 5/1995 | Asano et al. | |
| 5,553,453 A | 9/1996 | Coutant et al. | |
| 5,574,642 A | 11/1996 | Cooper | |
| 5,590,041 A | 12/1996 | Cooper | |
| 5,873,427 A * | 2/1999 | Ferguson et al. | 180/178 |
| 6,739,128 B2 | 5/2004 | Boyer et al. | |
| 7,146,263 B2 | 12/2006 | Guven et al. | |
| 7,147,078 B2 | 12/2006 | Teslak et al. | |
| 7,210,293 B2 | 5/2007 | Fukasawa et al. | |
| 7,287,620 B2 | 10/2007 | Thomas et al. | |
| 7,469,534 B2 | 12/2008 | Nishi et al. | |
| 7,930,843 B2 | 4/2011 | Hartwick | |
| 8,020,659 B2 | 9/2011 | Schultz et al. | |
| 2005/0177291 A1 | 8/2005 | Strashny et al. | |
| 2006/0070746 A1* | 4/2006 | Lumpkins et al. | 172/2 |
| 2010/0137102 A1 | 6/2010 | Sopko, Jr. et al. | |
| 2010/0154403 A1 | 6/2010 | Brickner et al. | |
| 2011/0202243 A1* | 8/2011 | Ishibashi et al. | 701/51 |
| 2012/0076670 A1 | 3/2012 | Rampen et al. | |
| 2012/0152642 A1 | 6/2012 | Takahashi et al. | |
| 2012/0166050 A1 | 6/2012 | Anderson et al. | |

* cited by examiner

RAMPING SUBSYSTEM FOR A MACHINE WITH A DUAL PATH ELECTRONICALLY CONTROLLED HYDROSTATIC TRANSMISSION

CROSS-REFERENCE TO RELATED APPLICATIONS

This application claims the benefit of U.S. Provisional Application No. 61/740,811, filed Dec. 21, 2012, entitled CONTROL SYSTEM FOR A HYDROSTATIC SYSTEM USING SCALED RAMPS, U.S. Provisional Application No. 61/740,772, filed Dec. 21, 2012, entitled LOAD CONTROL FOR MACHINES WITH HYDROSTATIC TRANSMISSION AND/OR IMPLEMENT SYSTEM, U.S. Provisional Application No. 61/740,750, filed Dec. 21, 2012, entitled STRAIGHT TRACKING CONTROL SYSTEM FOR A CRAWLER-TRACTOR, U.S. Provisional Application No. 61/740,788, filed Dec. 21, 2012, entitled CONTROL SYSTEM FOR A HYDROSTATIC SYSTEM, which Applications are incorporated by reference herein in their entirety.

BACKGROUND

The present application relates generally to a ramping subsystem for a control system for a machine with a dual path electronically controlled hydrostatic transmission having variable displacement pumps and/or variable displacement motors.

One type of machine with a dual path electronically controlled hydrostatic transmission or a dual path electro-hydraulic transmission that is used for propulsion and steering can be a crawler-tractor such as a bulldozer. "Bulldozers" or "dozers," as those terms may be used herein, refer to crawler-tractors that are equipped with a blade for scraping the ground or pushing material along the ground. The blade is pivotally connected to the crawler-tractor chassis such that it can pivot up and down. Blade controls are provided to the operator in the cab of the vehicle to permit the operator to raise and lower the blade with respect to the chassis of the crawler-tractor. One of the most common uses for blades on bulldozers is to level or otherwise contour the ground for the construction of houses, buildings, parking lots, and roads.

The hydrostatic transmission of the machine or bulldozer can use one or more pumps and one or more motors controlled by a controller for performing a variety of functions such as the propulsion and steering of the machine or bulldozer and implement operation on the machine or bulldozer. To reduce the rate of change of current commands given to the pump and motor solenoids when the machine or bulldozer is accelerated, decelerated or when the direction of the machine is changed (i.e., from forward to reverse or vice versa), a ramping subsystem or block can be used. There can be three ramping parameters or ramps associated with pump commands to move the machine in a forward or reverse direction: a ramping parameter or ramp that governs a rate of increase in pump command or displacement, a ramping parameter or ramp that governs a rate of decrease in pump command or displacement, and a ramping parameter or ramp that governs the rate of decrease of pump command or displacement only if the operator changes the machine direction. Since each ramping parameter of the ramping subsystem corresponds to a specific time constant, applying that parameter to two different commands having two different maximum magnitudes, but having identical rates of change, would take the same amount of time to achieve their corresponding maximum magnitude from the minimum magnitude which results in an unacceptable machine behavior to the operator driving the machine.

Therefore, what is needed is a ramping subsystem that can modify the rate of change of pump and motor commands based on their maximum magnitude.

SUMMARY

One embodiment of the present invention is directed to a method for controlling a machine with a dual path electronically controlled hydrostatic transmission. The method includes providing a machine having an engine and an electronically controlled hydrostatic transmission. The electronically controlled hydrostatic transmission includes an input device, a first drive system and a second drive system. Each of the first drive system and the second drive system have at least one pump and at least one motor. The input device provides a speed setting value for the first drive system and the second drive system. The method also includes generating at least one command for the at least one pump and the at least one motor of each of the first drive system and the second drive system with a controller and determining a change in the at least one generated command using the controller. The method further includes determining a ramping parameter based on the speed setting value provided by the input device and applying the determined ramping parameter to the at least one generated command to generate at least one modified command in response to the determination of a change in the at least one generated command. The method additionally includes applying the at least one modified command to the at least one pump and the at least one motor of each of the first drive system and the second drive system.

Another embodiment of the present invention is directed to a machine with a dual path electronically controlled hydrostatic transmission. The control system includes a first drive system and a second drive system. The first drive system includes a first pump solenoid and a first motor solenoid, a first pump controlled by the first pump solenoid and a first motor controlled by the first motor solenoid and powered by the first pump. The second drive system includes a second pump solenoid and a second motor solenoid, a second pump controlled by the second pump solenoid and a second motor controlled by the second motor solenoid and powered by the second pump. The control system includes an input device to generate a speed setting value in response to a user selecting a predefined discrete speed setting with the input device from a range of predefined discrete speed setting values bounded by a maximum speed setting value and a minimum speed setting value. The control system also includes a control device to generate pump and motor commands for the first pump solenoid, the first motor solenoid, the second pump solenoid and the second motor solenoid. The control device generates the pump and motor commands using a selected ramping parameters based on the speed setting value to modify the rate of change of the pump and motor commands. The selected ramping parameter is scaled in response to the selected speed setting value being other than the maximum speed setting value.

In one embodiment, the control system can use an approach that uses pump and motor ramping parameters that are selected to achieve desired performance of the machine and to satisfy operator feel when the machine is commanded from zero to maximum velocity at a maximum speed setting. The pump and motor ramping parameters are then scaled down for all the lower speed settings. The scaling can be linear or non-linear in order to achieve desired machine performance and operator feel at each selected speed setting value. The control system can use separate scaling curves for each specific ramping parameter: acceleration (accel) parameter; deceleration (decel) parameter; and direction change parameter. By scaling down the direction change parameter for the lower speeds, the amount of delay perceived by the operator can be minimized when moving from forward to reverse direction or vice versa while performing a direction change operation of the machine.

Other features and advantages of the present application will be apparent from the following more detailed description of the exemplary embodiments, taken in conjunction with the accompanying drawings.

BRIEF DESCRIPTION OF THE FIGURES

Wherever possible, the same reference numbers will be used throughout the drawings to refer to the same or like parts.

DETAILED DESCRIPTION OF THE EXEMPLARY EMBODIMENTS

In one exemplary embodiment, a machine with a dual path electronically controlled hydrostatic transmission (also referred to as a dual path electro-hydraulic transmission or ground drive system) can be a crawler-tractor. "Crawler-tractor" refers to any of the class of work vehicles or machines having a chassis, with an engine and ground-engaging endless-loop tracks that are located on either side of the chassis, that are driven by the engine, and that move the chassis over the ground. "Dozer" or "bulldozer" as used herein refers to a crawler-tractor coupled to a blade. Other examples of crawler-tractors can include harvesters, excavators and compact track loaders. Other examples of machines with dual path electronically controlled hydrostatic transmissions can include wheeled harvesters, wheeled excavators and wheeled compact loaders.

Figure 1:
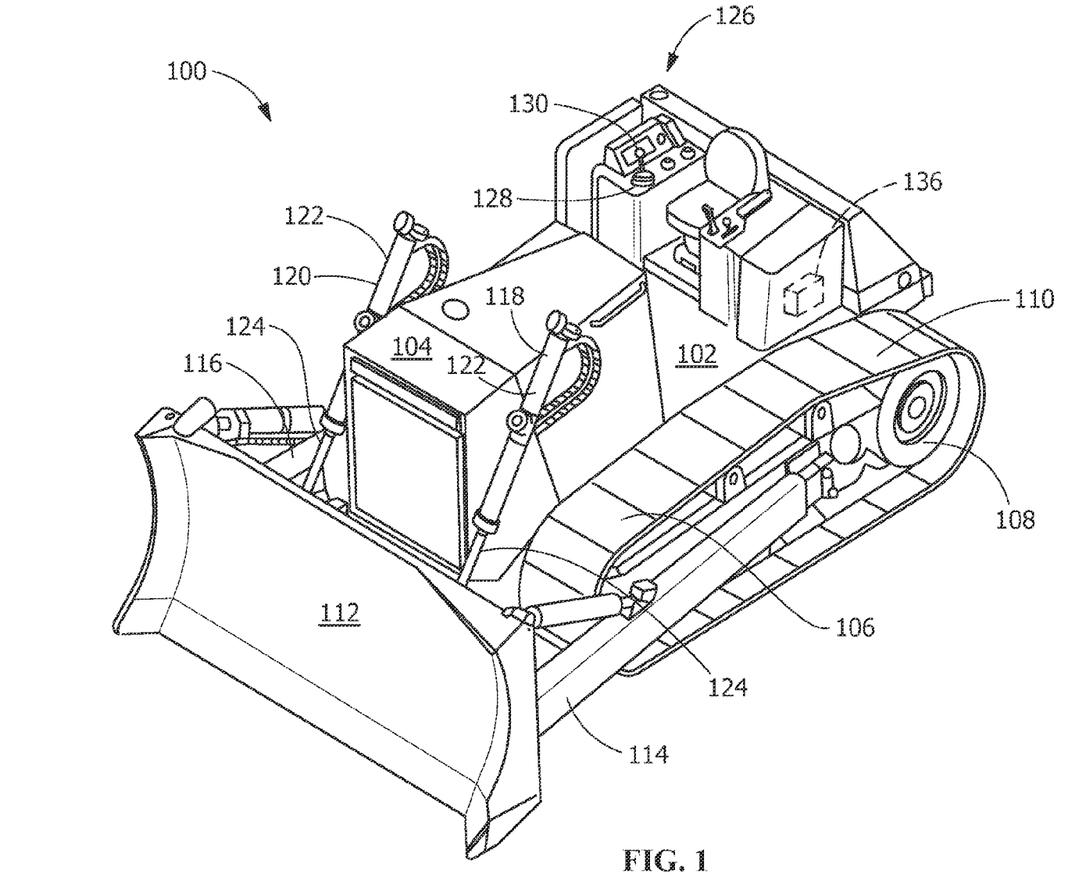
FIG. 1 shows a perspective view of an exemplary embodiment of a crawler-tractor.

Referring to FIG. 1, a crawler-tractor is shown. The crawler-tractor 100 includes a chassis 102 and an engine 104 fixed to the chassis 102. Crawler-tractor 100 also includes left side and right side drive systems 106, each of which includes a drive wheel 108 that is driven by a motor and an endless track 110 that is coupled to and driven by the drive wheel 108. The crawler-tractor 100 also includes a laterally extending blade 112 that is mounted to a left arm 114 and a right arm 116. Since the crawler-tractor shown in FIG. 1 includes a blade 112, the crawler-tractor 100 can also be referred to as a bulldozer or dozer 100. The arms 114, 116 of the dozer 100 can be pivotally coupled to the chassis 102 at the ends of the arms 114, 116 opposite the blade 112. The arms 114, 116 can be assisted in supporting the blade 112 by left and right hydraulic lift cylinders 118, 120. The left and right cylinder portions 122 of the hydraulic lift cylinders 118, 120 are coupled to the chassis 102 and the left and right rod ends 124 are coupled to the blade 112. When the operator extends or retracts cylinders 118, 120, the cylinders 118, 120 increase or decrease in length and lower or raise blade 112.

The operation of the dozer 100 can be controlled by an electronic controller 136. Electronic controller 136 can be a digital microprocessor-based controller having a RAM (random access memory), ROM (read only memory), CPU (central processing unit), sensor input and signal conditioning circuits, valve driver circuits, other memory devices, communications and interface circuits, and other control related components. The sensors and switches are coupled to the sensor input and signal conditioning circuits, the pilot valves and solenoids can be coupled to the valve driver circuits and other digital controllers can be coupled to the communications circuit. The ROM and other memory devices can store the CPU instructions that constitute the programs that are used in the operation of the dozer 100, the RAM and other memory devices can provide working space for the CPU to store values that change during operation, and the CPU executes the program instructions stored in ROM. All of these components can be coupled together by data, address and control buses in a conventional manner.

Dozer 100 has an operator's compartment or cab 126 from which the operator operates dozer 100. Among other controls, the cab 126 can include an operator input device 128 that the operator manipulates to steer and control the speed of the dozer 100. In one embodiment, the operator input device 128 can include a lever 130 with a neutral central position. Each of the left side and right side drive systems 106 are controlled with the operator input device 128. The operator input device 128 can be used to provide steering and speed control commands to each of the left side and right side drive systems 106 based on the "x-y" displacement of the operator input device 128 from the neutral (or center) position. In one embodiment, the operator can instruct the drive systems 106 by moving the input device 128 in one direction from neutral to move the machine or dozer 100 forward and can move the input device 128 in the other direction to move the machine or dozer 100 backward. By controlling the direction and amount that the operator input device 128 is moved from the neutral position, the operator can control the speed and direction of the machine or dozer 100.

Figure 2:
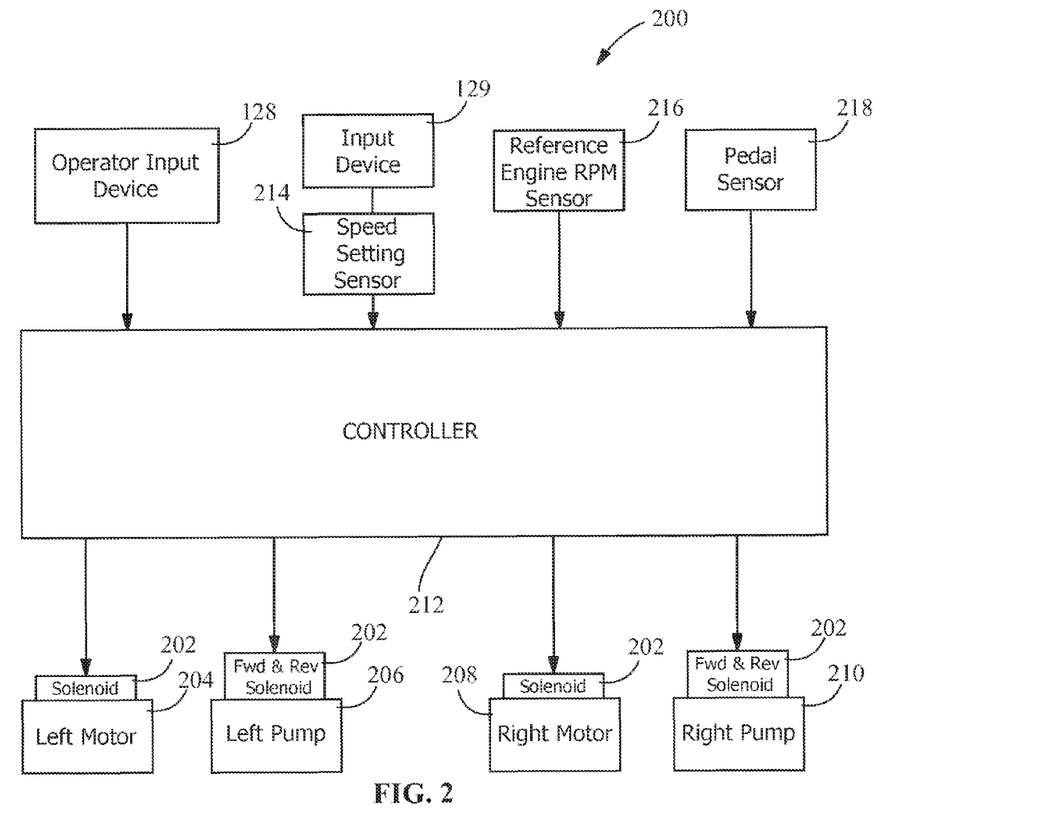
FIG. 2 shows a block diagram of an exemplary embodiment of a ground drive control system for a machine with a dual path electronically controlled hydrostatic transmission.

FIG. 2 shows an embodiment of a ground drive control system for a machine such as a crawler tractor or the dozer 100. The ground drive control system 200 can be part of the controller 136 either as an integrated system or a "stand-alone" subsystem. In another embodiment, the ground drive control system 200 can be separate system that can operate with little or no interaction with controller 136. The ground drive control system 200 can be used to control a dual path electronically controlled hydrostatic transmission system having variable displacement pumps and variable displacement motors. The pump and motor displacements can be determined by the ground drive control system based on the selected speed range, engine RPM, joystick position, pedal position and many other factors.

The ground drive control system 200 can be used to provide control signals or instructions to solenoids 202 that are used to control the operation of a left motor 204, a left pump 206, a right motor 208 and a right pump 210. The left pump 206 provides power to the left motor 204 which in turn drives a corresponding left drive wheel 108 and left track 110 (if a track vehicle). The right pump 210 provides power to the right motor 208 which in turn drives a corresponding right drive wheel 108 and right track 110 (if a track vehicle). In one exemplary embodiment, the left pump 206 and the right pump 210 can be controlled by forward and reverse solenoids 202.

A controller 212 can provide the control signals to the solenoids 202 based one or more input parameters. The input parameters can include propulsion and steering commands from the operator input device 128, a speed setting from a speed setting sensor 214, reference engine speed or revolutions per minute (RPM) from a reference engine RPM sensor 216 and a pedal signal or percentage from a pedal sensor 218. In one exemplary embodiment, the propulsion command from the operator input device 128 can be based on movement of the operator input device 128 along the Y-axis and can control the direction of movement (forward or reverse) of the machine and contribute to the magnitude of the machine velocity. The steering command can be based on movement of the operator input device 128 along the X-axis and can control the pump and motor displacements through machine turns. The pedal signal or percentage from pedal sensor 218 can be based on an amount a pedal, e.g., a brake pedal, is pressed and can increase or decrease the displacement commands to the pumps and motors based on the position of the pedal while the machine is moving in either the forward or reverse direction. The speed setting can correspond to a value selected by the operator with an input device 129 and can contribute to the magnitude of the maximum machine speed in either the forward or reverse direction. The selected speed setting value limits the maximum machine speed at a full stroke of operator input device 128 in either the forward or reverse direction, i.e., Y-axis movement. As the speed setting value decreases in either the forward or reverse direction, the maximum machine speed decreases in that particular direction at full stroke of the operator input device 128 along the Y-axis. The reference engine RPM can correspond to the position of a hand lever (e.g., a throttle) and can be used to scale the magnitude of the displacement command applied to the pump and motor solenoids if the reference engine RPM is below a predetermined threshold value. If the reference engine RPM is above the predetermined threshold value, then the reference engine RPM does not modify the pump or motor displacement command.

Figure 3:
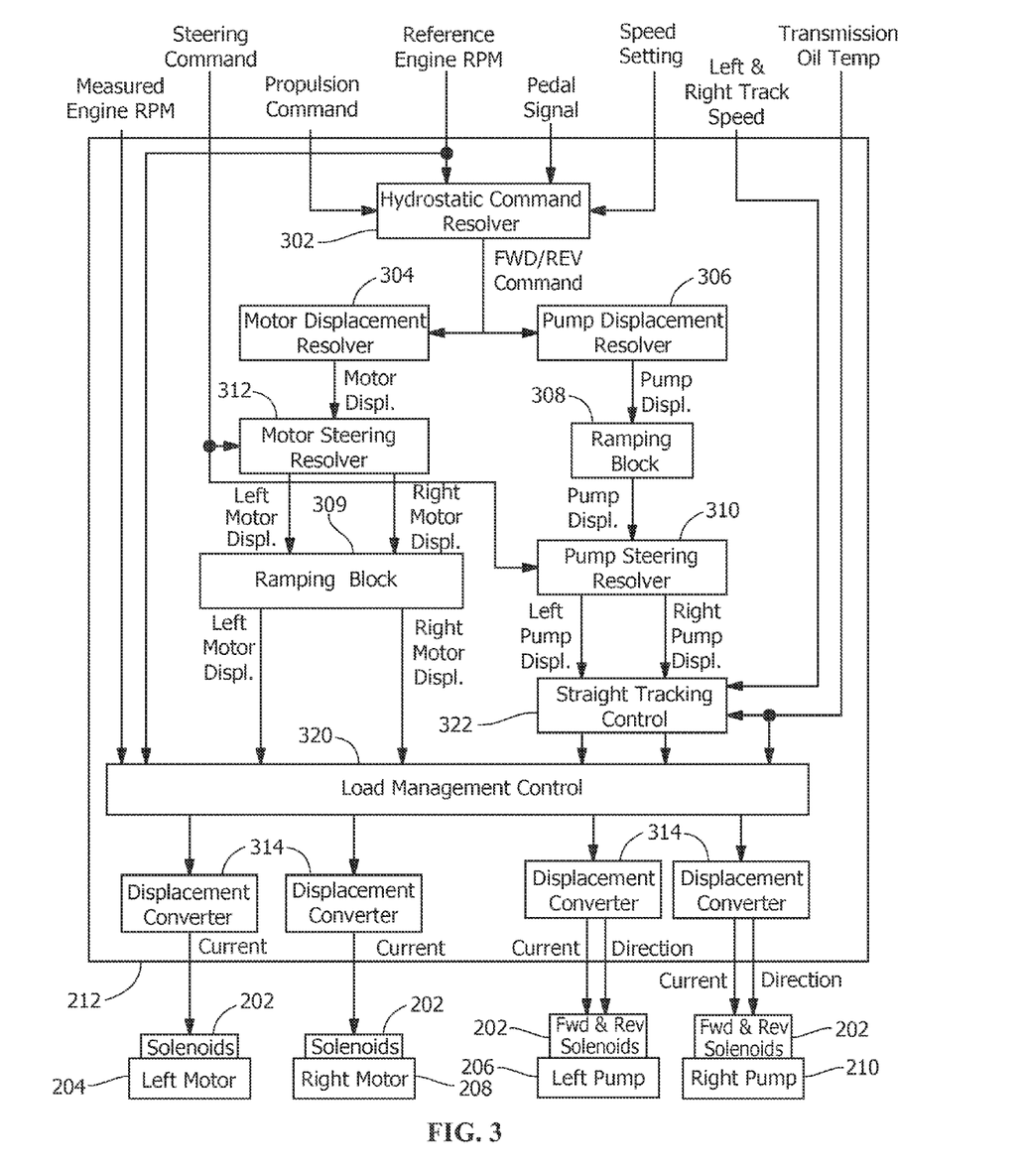
FIG. 3 shows a block diagram of an exemplary embodiment of a controller for the ground drive control system.

FIG. 3 shows an embodiment of the controller from the ground drive control system. The controller 212 has hydrostatic command resolver 302 that can receive the propulsion command from the operator input device 128, the reference engine RPM from the reference engine RPM sensor 216, the pedal signal from the pedal sensor 218 and the speed setting from the speed setting sensor 214. The hydrostatic command resolver 302 can process the input parameters and generate a forward or reverse (FWD/REV) command for a motor displacement resolver 304 and a pump displacement resolver 306.

In one exemplary embodiment, the hydrostatic command resolver 302 can include a microprocessor that can execute one or more control instructions to generate the forward or reverse (FWD/REV) command using equation 1:

$$\text{FWD/REV command} = J \times B \times S \times W \qquad (1)$$

wherein
J=propulsion command from the operator input device;
B=pedal signal (percentage) from the pedal sensor;
S=a value based on the speed setting from the speed setting sensor; and
W=a value based on the reference engine RPM from the reference engine RPM sensor.

In one exemplary embodiment, the propulsion command can be a value between −100 and 100, the speed setting can be a value between 1 and 15 and S can be determined such that there is an equal amount of speed increase or decrease with each consecutive speed setting value. In another exemplary embodiment, W can be 1 if the reference RPM is greater than a preselected RPM threshold value, e.g., 1500 and if the reference RPM is less than the preselected RPM threshold value, W can be calculated by equation 2.

$$W = \frac{\text{Reference Engine } RPM - \text{Tunable Paramater}}{\text{Preselected } RPM \text{ Threshold} - \text{Tunable Parameter}} \qquad (2)$$

In an exemplary embodiment, the FWD/REV command can be value in the range from −100 to 100. The hydrostatic command resolver 302 can be used to modify or adjust the propulsion command from the operator input device 128 in view of other operating parameters such as brake pedal position, speed setting and engine RPM.

Figure 4:
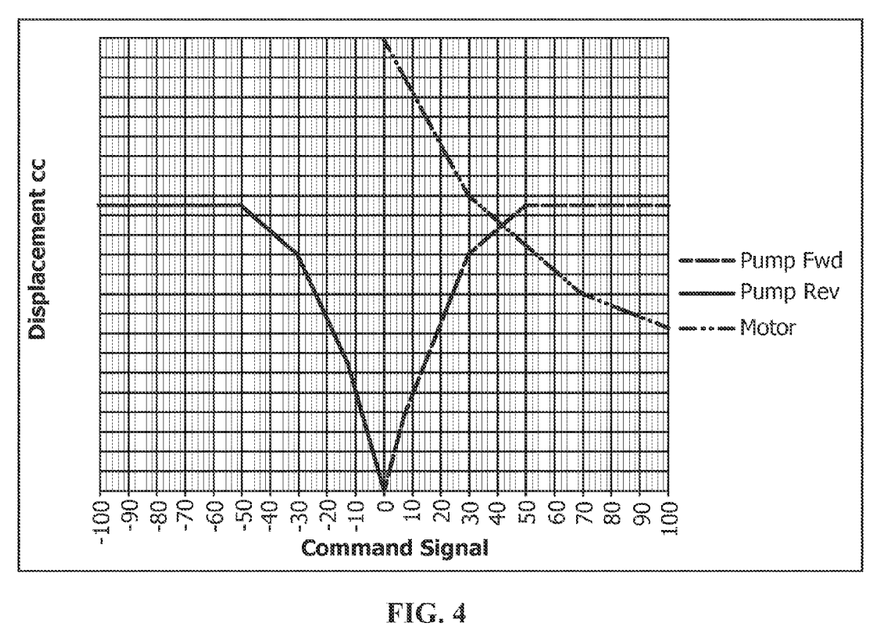
FIG. 4 shows an exemplary embodiment of pump and motor displacement curves used by the ground drive control system.

The motor displacement resolver 304 can receive the FWD/REV command from the hydrostatic command resolver 302 and can convert the FWD/REV command to a motor displacement signal or value. The pump displacement resolver 306 can receive the FWD/REV command from the hydrostatic command resolver 302 and can convert the FWD/REV command to a pump displacement signal or value. The pump and motor displacements can be in cubic centimeters (cc) or another suitable unit. The command direction can be used to determine if the calculated command would be applied to the forward or reverse solenoid of the pumps 206, 210. In one exemplary embodiment, each of the pump displacement resolver 306 and motor displacement resolver 304 can include a microprocessor that can execute one or more control instructions to apply the FWD/REV command to corresponding lookup tables to generate or determine the pump displacement or the motor displacement values. The lookup tables for the pump and motor displacements can be based on the preselected pump and motor curves shown in FIG. 4.

The pump displacement signal from the pump displacement resolver 306 can then be provided to a ramping block 308. The ramping block 308 can include a microprocessor that can execute one or more control instructions to reduce the rate of change of the pump displacement signal in increasing and decreasing directions to avoid abrupt commands to the pumps 206, 210 of the ground drive control system 200. Depending on the ramping selection used by the ramping block 308, the rate of change of the pump displacement signal in increasing and decreasing directions can be gradual, moderate, or aggressive.

Figure 8:
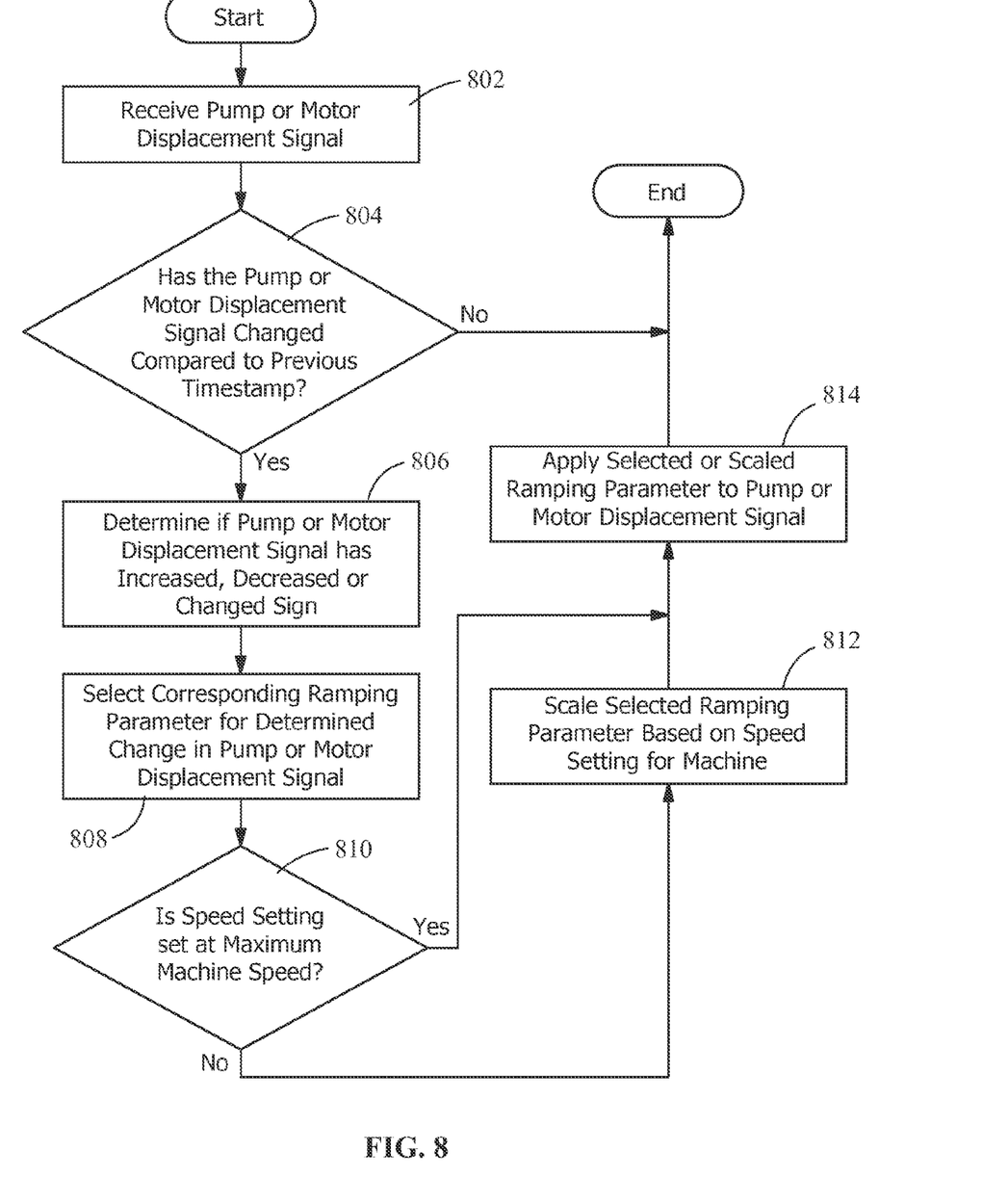
FIG. 8 shows an exemplary process for ramping pump and motor commands in the ground drive control system.

FIG. 8 shows an exemplary process for ramping pump and motor commands in the ground drive control system. The ramping block 308 receives the displacement signal for the pump or motor (step 802) and determines if the pump or motor signal has changed from the last cycle or iteration of the process (step 804). If the pump or motor signal has not changed from the last cycle, the ramping parameter value from the previous cycle is used and the process ends. However, if the pump or motor signal has changed, the ramping block 308 then determines if the pump or motor displacement command or signal prior to ramping block 308 has increased, corresponding to an acceleration command from the operator input device 128, decreased, corresponding to a deceleration command from the operator input device 128 or has changed sign, e.g., from positive to negative or vice versa, corresponding to a change direction command from operator input device 128 (step 806). After the ramping block 308 determines the type of change, e.g., acceleration, deceleration or change direction, of the pump or motor signal, the ramping block 308 then selects the corresponding ramping parameter for application to the pump and motor commands or signals (step 808).

Figure 9:
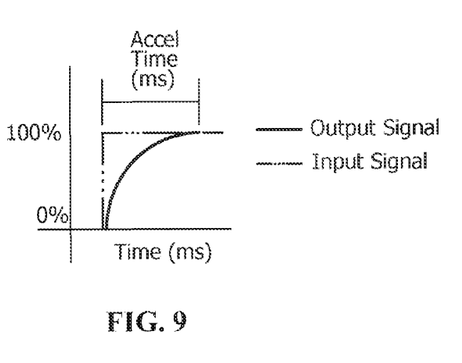
FIGS. 9-12 show exemplary embodiments of pump and motor ramps for the ground drive control system.
Figure 10:
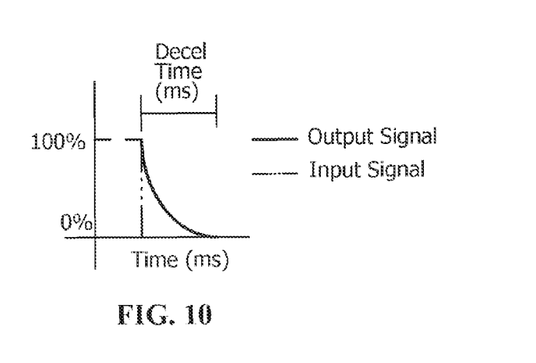
Figure 11:
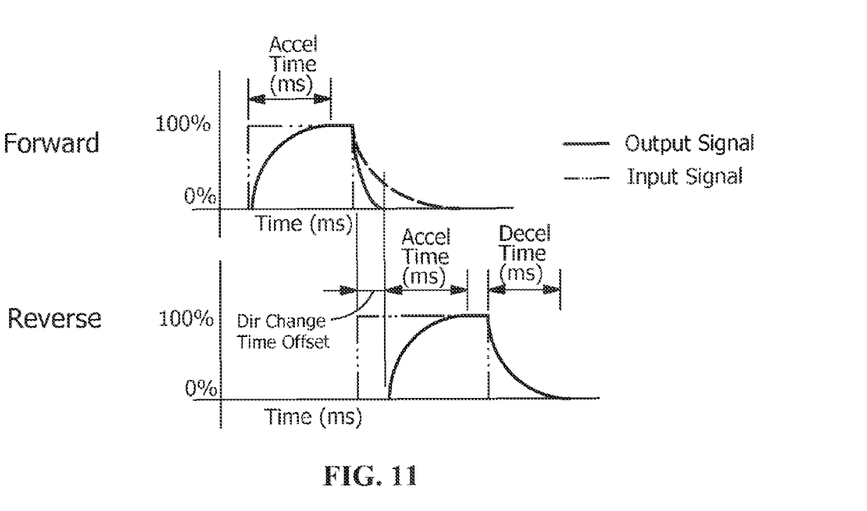

FIGS. 9-11 show exemplary embodiments of outputs of the ramping blocks in response to specific pump or motor commands at specific speed setting values. FIG. 9 shows an output of a ramping block in response to the steep increase of a pump or motor command at a specific speed setting value. The acceleration ramp parameter governs the rate at which the output signal to the pumps or motors increases with respect to the command or input signal. In one exemplary embodiment, there is a time delay between the input signal and the output signal while the current builds to the minimum value, e.g., 200 mA, for the command signal range, e.g., 200-600 mA. FIG. 10 shows an output of a ramping block in response to the steep decrease of a pump or motor command at a specific speed setting value. The deceleration ramp parameter governs the rate at which the output signal to the pumps or motors decreases as a result of a decrease in the command signal. FIG. 11 shows an output of the ramping block in response to a forward to immediate reverse pump or motor command at a specific speed setting in order to immediately move the machine from a maximum speed in the forward direction to a maximum speed in the reverse direction.

Once the appropriate ramping parameter for the maximum speed setting value has been selected, the ramping block 308 then determines if the speed setting for the machine is at a maximum value (step 810). If the speed setting for the machine is at the maximum value, the process applies the selected ramping parameter to the pump or motor signal (step 814) and the process ends. However, if the speed setting for the machine is not at a maximum value, then the process scales the selected ramping parameter based on the speed setting for the machine (step 812). The scaled ramping parameter is then applied to the pump or motor signal (step 814) and the process ends.

Figure 12:
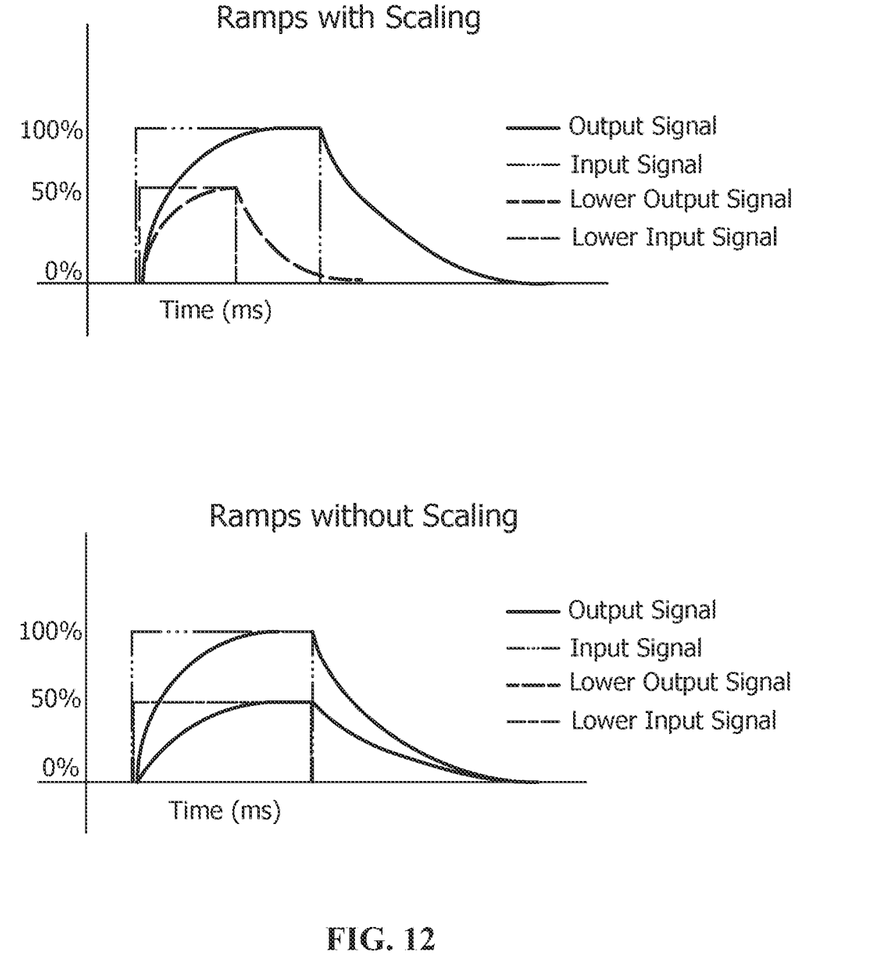

In one exemplary embodiment, the ramping block 308 scales the selected ramping parameter by selecting the corresponding scaling factor from the scaling factor table corresponding to the selected speed setting value for the machine by the operator using the input device 129. The ramping block 308 can have an acceleration scaling table, a deceleration scaling table and a change direction scaling table. Each of the tables in the ramping block 308 can include an array of values that scales down the selected ramping parameter for the selected speed setting based on the maximum speed setting of the machine. Stated differently, each of the tables can include a ramping parameter for each speed setting. In one embodiment, a stop table can be used and can be the same as the deceleration table, but in other embodiments, the stop table may different. In another exemplary embodiment, the scaling of the ramping parameter between speed settings may be non-linear to better correspond to the machine performance and operator expectations. FIG. 12 shows an exemplary embodiment of ramping parameters with scaling and without scaling. As shown in FIG. 12, when the ramping parameters are scaled down, the acceleration and deceleration times are reduced for a reduced speed setting. In contrast, when no scaling is applied, the acceleration and deceleration times for a reduced speed setting are the same as for the maximum speed setting.

In an exemplary embodiment, for a direction change, the pump and motor ramp direction change variables may be set such that the motor current reaches a minimum value when the forward and reverse pump currents cross each other. Increase and decrease of pump and motor displacements remain synchronized for each selected speed setting value.

The output signal (the ramped pump displacement signal) of the ramping block 308 can be provided to a pump steering resolver 310. The motor displacement signal from the motor displacement resolver 304 can be provided to the motor steering resolver 312.

The motor steering resolver 312 can include a microprocessor that can execute one or more control instructions to modify left and right motor displacement signals based on a turning amount commanded by the operator input device 128. The pump steering resolver 310 can include a microprocessor that can execute one or more control instructions to modify left and right pump displacement signals based on a turning amount commanded by the operator input device 128. The motor steering resolver 312 can determine a motor steering multiplier based on the steering command from the operator input device 128. The determined motor steering multiplier is then multiplied with the motor displacement signal or value to generate the modified motor displacement signal, value or command during the turn. In another embodiment, the displacement range for the motor, i.e., the difference between the minimum motor displacement and the maximum motor displacement, can be multiplied by a factor that is equal to 1 minus the motor steering multiplier and the result added to the minimum motor displacement to obtain the modified motor displacement signal or value. The modified motor displacement signal or value is then used for the left and right motor displacement signals. The left and right motor displacement signals can use the same value and can be equal during the turn.

The pump steering resolver 310 can determine a left pump steering multiplier and a right pump steering multiplier based on the steering command from the operator input device 128. The determined left pump steering multiplier is then multiplied with the ramped pump displacement signal or value to generate the left pump displacement signal, value, or command and the determined right pump steering multiplier is multiplied with the ramped pump displacement signal or value to generate the right pump displacement signal, value or command. In an exemplary embodiment, the left pump steering multiplier and the right pump steering multiplier can limit the pump displacement during straight movement of the machine to provide a margin of pump displacement for minor straight tracking corrections during the straight travel. In another exemplary embodiment, the left pump steering multiplier and the right pump steering multiplier can limit the pump displacement during straight movement of the machine to provide a margin of pump displacement to be available during a steering event.

Figure 5:
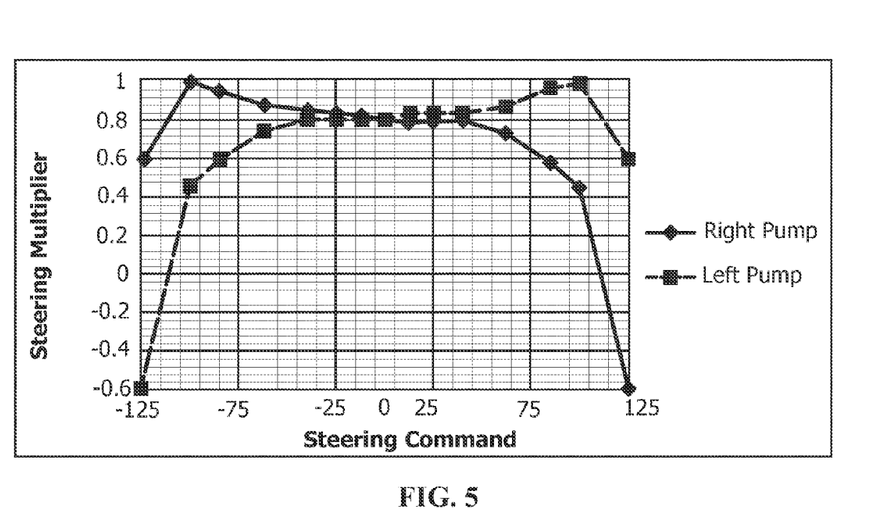
FIG. 5 shows an exemplary embodiment of pump steering curves used by the ground drive control system.

In one exemplary embodiment, pump steering resolver 310 and motor steering resolver 312 can use lookup tables that are based on the preselected pump and motor curves to determine the left motor steering multiplier, the right motor steering multiplier, the left pump steering multiplier and the right pump steering multiplier. Table 1 provides some exemplary values of the lookup tables for the pump steering resolver 310 and motor steering resolver 312. FIG. 5 shows an exemplary embodiment of the left and right pump steering curves associated with Table 1.

TABLE 1

| Steering Command | Right Pump | Left Pump | Right/ Left Motor |
|---|---|---|---|
| 125 | −0.6 | 0.6 | 0.0 |
| 100 | 0.45 | 1 | 0.50 |
| 85 | 0.58 | 0.95 | 0.60 |
| 62 | 0.73 | 0.87 | 0.75 |
| 40 | 0.79 | 0.84 | 0.86 |
| 25 | 0.79 | 0.83 | 0.93 |
| 12 | 0.79 | 0.82 | 0.98 |
| 0 | 0.8 | 0.8 | 1.0 |
| 0 | 0.8 | 0.8 | 1.0 |
| −12 | 0.82 | 0.79 | 0.98 |
| −25 | 0.83 | 0.79 | 0.93 |
| −40 | 0.84 | 0.79 | 0.86 |
| −62 | 0.87 | 0.73 | 0.75 |
| −85 | 0.95 | 0.58 | 0.60 |
| −100 | 1 | 0.45 | 0.50 |
| −125 | 0.6 | −0.6 | 0.0 |

The pump steering resolver 310 can also receive the steering signal or value (+ for steering right and − for steering left) from the operator input device 128. The pump steering resolver 310 can then select the appropriate steering multiplier for left and right pump displacements based on the steering direction i.e., steering left or right. In one exemplary embodiment, the lookup tables or curves for the left motor steering multiplier, right motor steering multiplier, the left pump steering multiplier and the right pump steering multiplier can be selected from a group of lookup tables or curves having smooth or gradual, moderate, or aggressive parameters. Some examples of the calculation of the modified motor displacement signals and the left and right pump displacement signals are provided in Examples 1-3. For Examples 1-3, the motor can have a minimum displacement of 83 cc, a maximum displacement of 230 cc and an operating range of 147 cc.

EXAMPLE 1

Propulsion Command=100, Steering Command=0 (no steering; straight movement).

| Pump/Motor Displacement | Steering Multiplier Output: | | |
|---|---|---|---|
| Pump = 145 cc | Left Pump = 0.8 | L Pump = 145 cc * 0.8 = 116 cc | |
| | Right Pump = 0.8 | R Pump = 145 cc * 0.8 = 116 cc | |
| Motor = 83 cc | Motor = 1.0 | Motor = 147 cc * (1 − 1.0) + 83 cc = 83 cc | |

EXAMPLE 2

Propulsion Command=100, Steering Command=40 (right turn)

| Pump/Motor Displacement | Steering Multiplier Output: | |
|---|---|---|
| Pump = 145 cc | Left Pump = 0.84 | L Pump = 145 cc * 0.84 = 121.8 cc |
| | Right Pump = 0.79 | R Pump = 145 cc * 0.79 = 114.55 cc |
| Motor = 83 cc | Motor = 0.86 | Motor = 147 cc * (1 − 0.86) + 83 cc = 103.58 cc |

EXAMPLE 3

Propulsion command=100, Steering Command=−125 (counter-rotate)

| Pump/Motor Displacement | Steering Multiplier Output: | |
|---|---|---|
| Pump = 145 cc | Left Pump = 0.6 | Left Pump = 145 cc * 0.6 = 87 cc |
| | Right Pump = −0.6 | Right Pump = 145 cc * 0.6 = 87 cc (in the reverse direction) |
| Motor = 83 cc | Motor = 0.0 | Motor = 147 cc * (1 − 0.0) + 83 cc = 230 cc |

After the left and right motor displacement signals or values are generated by the motor steering resolver 312, the left and right motor displacement signals are applied to ramping block 309. The ramping block 309 can include a microprocessor that can execute one or more control instructions to smooth out the left and right motor displacement signals by controlling the rate of change of the motor displacement signal in order to avoid abrupt commands to the motors 204, 208 of the ground drive control system 200. Depending on the ramping selection used by the ramping blocks 309, the rate of change of the left and right motor displacement signals can be gradual, moderate, or aggressive. The aggressive ramp can be limited by driveline pressure and the engine's response to a change in load. The ramping block 309 for the left and right motor displacement signals or values can operate in a similar manner as the ramping block 308 for the pump displacement signal. The ramping block 309 can be used in conjunction with both steering operations and straight motion. In one embodiment, the ramping block 309 can have individual ramping blocks for each of the left and right motor displacement signals, which can use either the same values or different values.

The output signals of the motor ramping block 309 can be provided to load management or load control subsystem 320. In addition, the left and right pump displacement signals can be provided to straight tracking control subsystem 322. The output of the straight tracking control subsystem 322 is provided to the load management subsystem 320. The output of the load management subsystem 320 is provided to the displacement converters 314. In another embodiment, the ground drive control system does not have to use either or both of the straight tracking control subsystem 322 and the load management subsystem 320.

Figure 6:
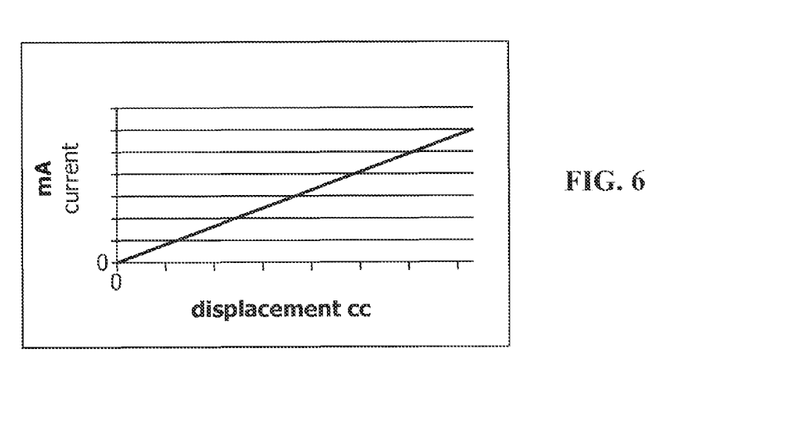
FIG. 6 shows an exemplary embodiment of a curve showing pump solenoid current values with respect to pump displacement values used by the ground drive control system.

The displacement converters 314 take the modified left and right motor displacement signals and the left and right pump displacement signals, all of which are in terms of displacement, e.g., cc, and convert the signals into current commands to drive the solenoids 202. In one exemplary embodiment, each of the displacement converters 314 can include a microprocessor that can execute one or more control instructions to apply the displacement signal to a corresponding lookup table to generate or determine the solenoid current commands. The lookup table(s) for the solenoid current commands can be based on the preselected solenoid curves shown in FIG. 6. In one embodiment, one or more lookup tables and/or curves can be used and can be adapted to a specific component. In another embodiment, the displacement converter 314 determines the direction signal based on whether the displacement signal has a positive or negative value. If the displacement signal has a positive value, the direction signal is used to apply current to the forward pump solenoid and if the displacement signal has a negative value, the direction signal is used to apply current to the reverse pump solenoid.

Figure 7:
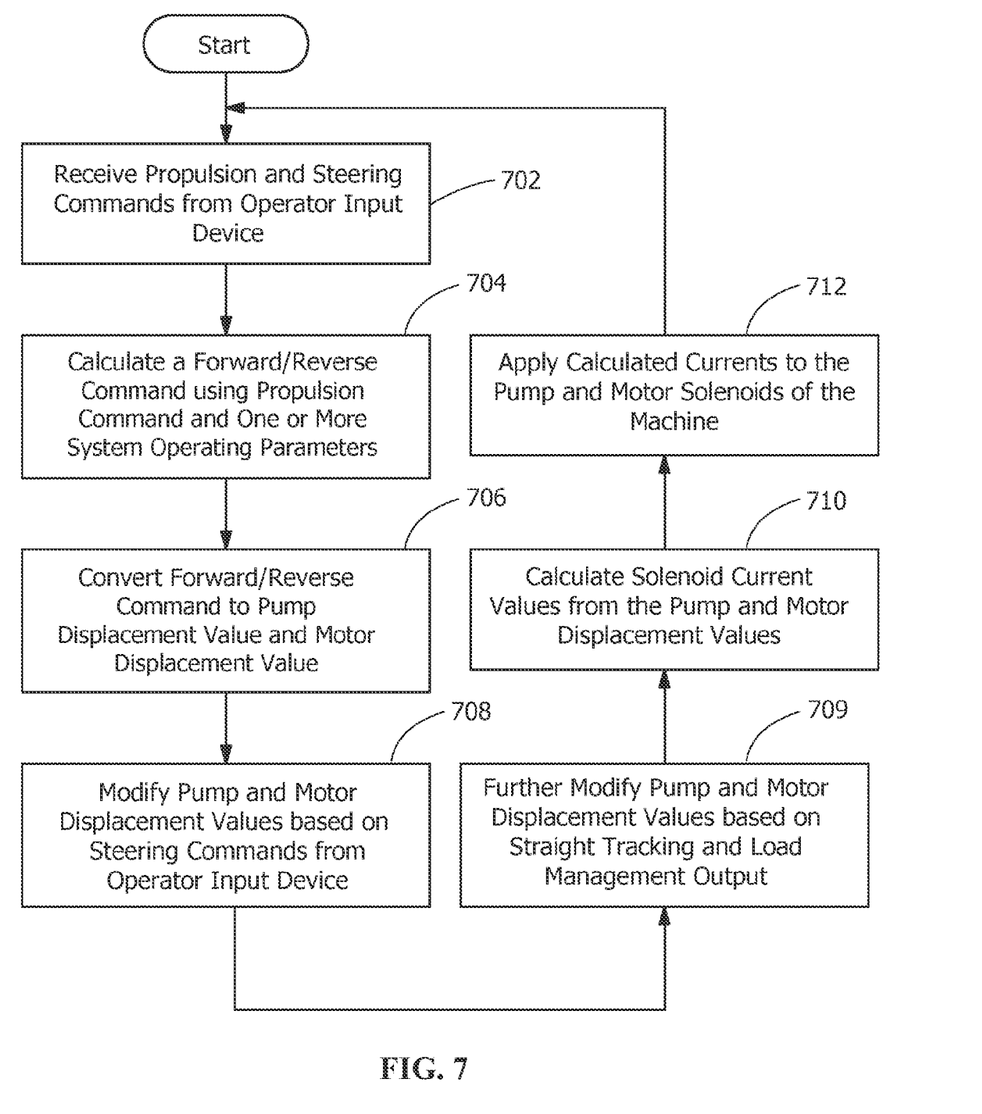
FIG. 7 shows an exemplary process for implementing a ground drive control system on a machine.

FIG. 7 shows an exemplary process for implementing the ground drive control on a machine or crawler-tractor. The process begins by receiving propulsion and steering commands from the operator input device 128 (step 702). A FWD/REV command can be determined or calculated from the propulsion command and one or more system operating parameters, which may include a speed setting, a reference engine RPM, and/or a brake pedal position signal (step 704). The FWD/REV command can then be converted to a pump displacement command or value and a motor displacement command or value (step 706). In one exemplary embodiment, a direction can also be calculated from the FWD/REV command. The steering command from the X-axis of the operator input device 128 can then be used to determine or calculate modified pump and motor displacement commands or values (step 708). In one exemplary embodiment, the pump displacement value can be applied to a ramping block. In another exemplary embodiment, the pump displacement values can include left and right pump displacement values and the motor displacement values can include left and right motor displacement values. The modified pump and motor displacement commands or values can be further modified by straight tracking and load management controls, if present (step 709). The modified pump displacement values and the modified motor displacement values can be converted to solenoid current commands (step 710). In one exemplary embodiment, the left and right motor displacement values can be applied to ramping blocks before being converted to solenoid current commands. The generated solenoid current commands are then applied to the solenoids of the pumps and motors of the machine (step 712).

It should be understood that the application is not limited to the details or methodology set forth in the following description or illustrated in the figures. It should also be understood that the phraseology and terminology employed herein is for the purpose of description only and should not be regarded as limiting.

The present application contemplates methods, systems and program products on any non-transitory machine-readable media for accomplishing its operations. The embodiments of the present application may be implemented using existing computer processors, or by a special purpose computer processor for an appropriate system, or by a hardwired system.

Embodiments within the scope of the present application include program products comprising machine-readable media for carrying or having machine-executable instructions or data structures stored thereon. Machine-readable media can be any available non-transitory media that can be accessed by a general purpose or special purpose computer or other machine with a processor. By way of example, machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Likewise, software implementations could be accomplished with standard programming techniques with rule based logic and other logic to accomplish the various connection steps, processing steps, comparison steps and decision steps.

In the further consideration of the drawings of this application and the discussion of such drawings and the elements shown therein, it should also be understood and appreciated that, for purposes of clarity in the drawings, pluralities of generally like elements positioned near to one another or extending along some distance may sometimes, if not often, be depicted as one or more representative elements with extended phantom lines indicating the general extent of such like elements. In such instances, the various elements so represented may generally be considered to be generally like the representative element depicted and generally operable in a like manner and for a like purpose as the representative element depicted.

Many of the fastening or connection processes and components utilized in the application are widely known and used, and their exact nature or type is not necessary for an understanding of the application by a person skilled in the art. Also, any reference herein to the terms "left" or "right" is used as a matter of mere convenience, and is determined by standing at the rear of the machine facing in its normal direction of travel. Furthermore, the various components shown or described herein for any specific embodiment in the application can be varied or altered as anticipated by the application and the practice of a specific embodiment of any element may already be widely known or used by persons skilled in the art.

It will be understood that changes in the details, materials, steps and arrangements of parts which have been described and illustrated to explain the nature of the application will occur to and may be made by those skilled in the art upon a reading of this disclosure within the principles and scope of the application. The foregoing description illustrates an exemplary embodiment of the invention; however, concepts, as based upon the description, may be employed in other embodiments without departing from the scope of the application.

While the application has been described with reference to an exemplary embodiment, it will be understood by those skilled in the art that various changes may be made and equivalents may be substituted for elements thereof without departing from the scope of the application. In addition, many modifications may be made to adapt a particular situation or material to the teachings of the application without departing from the essential scope thereof Therefore, it is intended that the application not be limited to the particular embodiment disclosed as the best mode contemplated for carrying out this application, but that the invention will include all embodiments falling within the scope of the appended claims.

What is claimed is:

1. A method for controlling a machine with a dual path electronically controlled hydrostatic transmission, the method comprising:
    providing a machine having an engine and an electronically controlled hydrostatic transmission, the electronically controlled hydrostatic transmission including an input device, a first drive system and a second drive system, each of the first drive system and the second drive system having at least one pump and at least one motor, the input device providing a speed setting value for the first drive system and the second drive system;
    generating at least one command for the at least one pump and the at least one motor of each of the first drive system and the second drive system with a controller;
    determining a change in the at least one generated command using the controller;
    determining a ramping parameter controlling the rate of change of the pump displacement to avoid abrupt commands to the said at least one pump based on the speed setting value provided by the input device;
    applying the determined ramping parameter to the at least one generated command to generate at least one modified command in response to the determination of a change in the at least one generated command; and
    applying the at least one modified command to the at least one pump and the at least one motor of each of the first drive system and the second drive system.

2. The method of claim 1 wherein said determining a ramping parameter includes determining whether the provided speed setting value is less than a maximum speed setting value.

3. The method of claim 2 wherein said determining a ramping parameter includes scaling the ramping parameter in response to a determination that the provided speed setting value is less than the maximum speed setting value.

4. The method of claim 3 wherein said scaling the ramping parameter includes selecting a scaling factor corresponding to the provided speed setting value.

5. The method of claim 4 wherein the provided speed setting value is selected from a predefined number of discrete speed setting values arranged between the maximum speed setting value and a minimum speed setting value and each predefined discrete speed setting value has a corresponding scaling factor.

6. The method of claim 5 wherein the corresponding scaling factor has a linear relationship with the predefined discrete speed setting value.

7. The method of claim 5 wherein the corresponding scaling factor has a non-linear relationship with the predefined discrete speed setting value.

8. The method of claim 1 wherein said determining a change in the at least one generated command includes determining whether a value of the at least one generated command has increased, decreased or changed sign compared to a value of a corresponding command at a previous time stamp.

9. The method of claim 8 wherein said determining a ramping parameter includes determining a ramping parameter based on the determination of whether the value of the at least one generated command has increased, decreased or changed sign compared to the value of the corresponding command at the previous time stamp.

10. The method of claim 9 wherein said determining a ramping parameter includes:
    selecting an acceleration ramping parameter in response to a determination that the value of the at least one generated command has increased compared to the value of the corresponding command at the previous time stamp;
    selecting a deceleration ramping parameter in response to a determination that the value of the at least one generated command has decreased compared to the value of the corresponding command at the previous time stamp; and
    selecting a change direction ramping parameter in response to a determination that the value of the at least one generated command has changed sign compared to the value of the corresponding command at the previous time stamp.

11. The method of claim 10 wherein said determining a ramping parameter includes scaling the acceleration ramping parameter, the deceleration ramping parameter or the change direction ramping parameter with a scaling factor in response to the determination that the provided speed setting value is less than the maximum speed setting value.

12. The method of claim 1 further comprising applying a prior ramping parameter to the at least one generated command in response to a determination that a value of the at least one generated command has not changed.

13. The method of claim 1 wherein said generating at least one command includes generating at least one of an acceleration command, a deceleration command or a direction change command.

14. A machine with a dual path electronically controlled hydrostatic transmission comprising:
    a first drive system comprising:
        a first pump solenoid and a first motor solenoid;
        a first pump controlled by the first pump solenoid; and
        a first motor controlled by the first motor solenoid and powered by the first pump;
    a second drive system comprising:
        a second pump solenoid and a second motor solenoid;
        a second pump controlled by the second pump solenoid; and
        a second motor controlled by the second motor solenoid and powered by the second pump;
    an input device, the input device generating a speed setting value in response to a user selecting a predefined discrete speed setting value with the input device from a range of predefined discrete speed setting values bounded by a maximum speed setting value and a minimum speed setting value; and
    a control device to generate pump and motor commands for the first pump solenoid, the first motor solenoid, the second pump solenoid and the second motor solenoid, the control device generates the pump and motor commands using a selected ramping parameter controlling the rate of change of the pump displacement to avoid abrupt commands to the said first and second pumps based on the speed setting value and modifies the rate of change of the pump and motor commands, the selected ramping parameter being scaled in response to the selected speed setting value being other than the maximum speed setting value.

15. The machine of claim 14 wherein the scaled selected ramping parameter is determined by applying a scaling factor corresponding to the selected speed setting value to a ramping parameter associated with the maximum speed setting value.

16. The machine of claim 15 wherein each predefined discrete speed setting value has a corresponding scaling factor.

17. The machine of claim 16 wherein the corresponding scaling factor has one of a linear relationship or a non-linear relationship with the predefined discrete speed setting value.

18. The machine of claim 14 wherein the control device determines whether value of the pump and motor commands have increased, decreased or changed sign compared to values of corresponding pump and motor commands at a previous timestamp.

19. The machine of claim 18 wherein the selected ramping parameter includes:

an acceleration ramping parameter in response to a determination that the values of the pump and motor commands have increased compared to values of the corresponding pump and motor commands at the previous time stamp;

a deceleration ramping parameter in response to a determination that the values of the pump and motor commands have decreased compared to values of the corresponding pump and motor commands at the previous time stamp; and a change direction ramping parameter in response to a determination that the values of the pump and motor commands have changed sign compared to values of the corresponding pump and motor commands at the previous time stamp.

20. The machine of claim 18 wherein the control device generates the pump and motor commands using the ramping parameter from the previous timestamp in response to the determination that the pump and motor commands have not changed since the previous timestamp.

* * * * *